Patented May 12, 1936

2,040,406

UNITED STATES PATENT OFFICE 2,040,406

CHEMICAL HEATING COMPOSITION AND METHOD OF CHEMICALLY PRODUCING HEAT

Raymond E. Reed, Chicago, Ill., assignor to The Kendall Company, Chicago, Ill., a corporation of Massachusetts No Drawing. Application November 7, 1932, Serial No. 641,615

15 Claims. (Cl. 44—3)

This invention relates to heating compositions of the type which produce heat by chemical action with water, and to an improved method of generating heat by the use of compositions of this type.

Heating compositions or combinations of this class have a wide field of use in the heat pad art, the heat pads being used much as in the manner of use of the ordinary hot water bottle or for any of a wide variety of other uses. These heating compositions usually contain a base metal, such as iron in finely divided condition, or a metal having the properties of iron, that is, metals which are susceptible to oxidation under the conditions which would result in oxidation of iron. Such compositions also include an electrolyte, which usually comprises a salt of a metal which is electrolytically replaceable by the base metal. Much difficulty has been experienced in the use of compositions of this type by reason of the fact that the electrolytes now commonly used are readily decomposed by atmospheric moisture. This results in rapid aging of the mixture, so that frequently it has only a portion of its full strength at the time it is ready to be used.

The principal object of the present invention is to provide a heating combination which will remain stable for long periods of time.

In general, I find that a much more stable heating combination will be obtained by substituting for the replaceable electrolytes now commonly used, and which are readily soluble in water, a replaceable electrolyte which is highly insoluble in water. The use of a replaceable electrolyte which is highly insoluble in water necessitates the addition to the mixture of an electrolytic reagent which will, upon the addition of water to the mixture, effect solution of the replaceable electrolyte. Otherwise, of course, the metallic ions of the electrolyte would not be available for replacement by the base metal, and no heat would be evolved. I have found that the presence in the mixture of a substance which, in water solution, will give a surplus of hydrogen ions will promote the solubility of the replaceable electrolyte.

One of the compositions now commonly used comprises a mixture of iron and cupric chloride. This mixture is exceedingly unstable because of the high degree of solubility of the cupric chloride which is readily attacked by atmospheric moisture and thus rapidly ages, even when in a comparatively dry atmosphere. I have found that a supply of replaceable copper ions may be incorporated in this composition by substituting for the cupric chloride a salt, such as cupric carbonate, which is highly insoluble in water and which is stable in the dry state under normal atmospheric conditions. To effect solution of the cupric carbonate, it is necessary to include in the mixture some substance which will ready dissolve in water to form an acidic solution. The more highly acid the solution, the more readily will the cupric carbonate be dissolved. Oxalic acid is one example of a substance which is readily soluble in water to form a solution in which cupric carbonate may be easily dissolved. A heating mixture comprising iron, cupric carbonate, and oxalic acid will give appreciable amounts of heat and will be very stable due to the high insolubility of cupric carbonate. Oxalic acid, however, is quite a weak acid, and in order to provide a greater concentration of hydrogen ions or to otherwise produce with the metallic ion of the stable electrolyte a compound which will better react with the base metal than would the compound produced by the action of the oxalic acid alone upon said stable electrolyte, I prefer to use, in combination therewith, a salt which will interact with oxalic acid to accomplish this purpose. Barium chloride is one example of a salt which I have found highly satisfactory for this purpose since it is not readily decomposed by atmospheric moisture, and therefore, in the dry state, is stable under ordinary conditions of temperature and pressure. The following is an example of a mixture using oxalic acid and barium chloride which has proved very satisfactory, both from the standpoint of heat generation and from the standpoint of stability:

| | Grams |
|---|---|
| Oxalic acid | 10 |
| Barium chloride | 21 |
| Cupric carbonate | 25 |
| Iron filings | 600 |

When water is added to the above mixture, the oxalic acid and barium chloride dissolve readily and ionize to form a solution having a high concentration of free hydrogen ions. The cupric carbonate, although highly insoluble in water, readily dissolves in the acid solution which is formed by the interaction of oxalic acid and barium chloride. The metallic copper ions are thus brought into solution and are then available for the regular replacement reaction by iron, which is highly exothermic.

The heat generating capacity of the mixture which has just been described may be increased by including therein, in addition to the base metal iron, a second metal, such as aluminum, which is positioned above iron in the electromotive series of metals. When aluminum is used in conjunction with iron, the copper, instead of being replaced by iron, is replaced by aluminum, resulting in the formation of aluminum chloride instead of ferrous chloride. The heat of formation of aluminum chloride is much greater than that of ferrous chloride, and hence the presence of aluminum gives rise to greater heat generation. Other metals which are above iron in the electromotive series, such as zinc and magnesium, act much as aluminum in these mixtures. The heats of formation of compounds of these metals are found to be greater, the higher the position of the metal in the electromotive series. The use of aluminum also permits a reduction in the amount of replaceable electrolyte required to generate a given amount of heat, thereby effecting a substantial saving in the cost of the mixture. The following is an example of a mixture using aluminum:

| | Grams |
|---|---|
| Oxalic acid | 3.5 |
| Barium chloride | 7 |
| Cupric carbonate | 8.5 |
| Aluminum | 2 |
| Iron filings | 600 |

In this mixture the cupric carbonate is brought into solution in substantially the same manner as in the immediately preceding example. However, in this case, as above pointed out, the cupric ions, instead of being replaced by iron, are replaced by aluminum, resulting in the formation of aluminum chloride.

In the two foregoing examples various acids may be used in lieu of oxalic acid, among which may be mentioned boric, molybdic, tartaric, and tannic. These acids, of course, must all be of the type which are normally in the solid state, and which are soluble in water. Various salts may be used in lieu of the barium chloride in the two foregoing examples. Among these salts may be mentioned the following: the water-soluble chlorides, sulphates, acetates, and nitrates of the alkali and alkaline earth metals. Some of these salts do not increase the hydrogen ion concentration but any of them will promote the solution of the stable electrolyte.

While in the foregoing examples it has been assumed that the replaceable metal, such as copper, would be embodied in the mixture in the form of an insoluble salt, it is to be understood that the replaceable metal need not be necessarily introduced into the mixture in this form. The object is to have the replaceable metal in the mixture in such condition that it will be highly insoluble in water, but will be readily soluble in solutions which are acidic in nature. I have found that in lieu of the cupric carbonate in the foregoing examples, there may be substituted the following replaceable metals and compounds of metals: cupric phosphate, cupric oxide, cuprous oxide, metallic copper, metallic tin, metallic nickel, metallic antimony, and antimonious oxide. All of these metals are replaceable by iron, and at the same time both the metals, and their derivatives, while highly insoluble in water, are readily soluble in solutions having a fairly high concentration of free hydrogen ions.

I have found that in cases where an additional metal, such as aluminum, is used in the mixture in conjunction with iron, it is not necessary to use the combination of an acid and a salt to effect solution of the cupric carbonate or other insoluble replaceable electrolyte. For example, I have found that in lieu of using oxalic acid and barium chloride in the second of the foregoing examples, there may be substituted a salt such as lead chloride. An example of a mixture of this type is the following:

| | Grams |
|---|---|
| Lead chloride | 10 |
| Cupric carbonate | 8.5 |
| Aluminum (100 mesh) | 2 |
| Iron filings | 600 |

In this mixture the first reaction which takes place is the replacement of the lead by aluminum to form aluminum chloride. The aluminum chloride, being the salt of a strong acid and a weak base, gives a high concentration of free hydrogen ions, thereby effecting solution of the cupric carbonate. The cupric ions, being thus brought into solution, are then replaced by the aluminum, which replacement reaction is accompanied by the evolution of heat. Other examples of salts of the nature of lead chloride which may be used in the above mixture are: lead sulphate, antimony oxychloride, cuprous chloride, and mercurous chloride. These salts may all be described as being salts of metals which are replaceable by aluminum, and the acid radical of which is of the class which forms acid salts with aluminum.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. A heat pad composition for producing a moderate and sustained heat by chemical action with water comprising a mixture of iron in finely divided condition, a second metal selected from the group of metals positioned above iron in the electromotive series of metals, an electrolyte of the class which forms acidic solutions when dissolved in water, and a substance selected from the group consisting of those metals and compounds of metals which are replaceable by said second metal, said substance being highly insoluble in water and non-reactive when mixed with iron in the dry state, but readily soluble in water solutions of said electrolyte.

2. A heat pad composition for producing a moderate and sustained heat by chemical action with water comprising a mixture of iron in finely divided condition, finely divided aluminum, an electrolyte of the class which forms acidic solutions when dissolved in water, and a substance selected from the group consisting of those metals and compounds of metals which are replaceable by iron, said substance being highly insoluble in water and non-reactive when mixed with iron in the dry state, but readily soluble in water solutions of said electrolyte.

3. A heat pad composition for producing a moderate and sustained heat by chemical action with water comprising a mixture of iron in finely divided condition, finely divided aluminum, an electrolyte of the class which forms acidic solutions when dissolved in water, and a substance selected from the group consisting of copper and those compounds of copper which are highly insoluble in water and non-reactive when mixed with iron in the dry state, but readily soluble in water solutions of said electrolyte.

4. A heat pad composition for producing a moderate and sustained heat by chemical action with water comprising a mixture of iron in finely divided condition, oxalic acid, barium chloride, and a substance selected from the group consisting of those metals and compounds of metals which are replaceable by iron, said substance being highly insoluble in water and non-reactive when mixed with iron in the dry state, but readily soluble in solutions containing oxalic acid and barium chloride.

5. A heat pad composition for producing a moderate and sustained heat by chemical action with water comprising a mixture of iron in finely divided condition, oxalic acid, barium chloride, and cupric carbonate.

6. A heat pad composition for producing a moderate and sustained heat by chemical action with water comprising a mixture of iron in finely divided condition, finely divided aluminum, an acid of the class which is readily soluble in water, an electrolyte comprising a salt which interacts with a water solution of said acid to increase the hydrogen ion concentration of the solution, and a substance selected from the group consisting of those metals and compounds of metals which are replaceable by iron, said substance being highly insoluble in water and non-reactive when mixed with iron in the dry state, but readily soluble in solutions having an acid reaction.

7. A heat pad composition for producing a moderate and sustained heat by chemical action with water comprising a mixture of iron in finely divided condition, and small amounts of finely divided aluminum, oxalic acid, barium chloride, and cupric carbonate.

8. A heat pad composition for producing a moderate and sustained heat by chemical action with water comprising a mixture of iron in finely divided condition, finely divided aluminum, an electrolyte comprising a salt of a metal replaceable by aluminum, the acid radical of said salt being of the class which forms acid salts with aluminum, and a substance selected from the group consisting of those metals and compounds of metals which are replaceable by iron, said substance being highly insoluble in water and non-reactive when mixed with iron in the dry state, but readily soluble in solutions of the acid salts formed by interaction of aluminum and said electrolyte.

9. A heat pad composition for producing a moderate and sustained heat by chemical action with water comprising a mixture of iron in finely divided condition, and small amounts of finely divided aluminum, lead chloride, and cupric carbonate.

10. A chemical heating composition for a heat pad adapted to produce heat by chemical action with water, comprising a finely divided mixture of a base metal having the properties of iron, a substance selected from the group consisting of those metals and compounds of metals which are electrolytically replaceable by said base metal, said substance being highly insoluble in water and non-reactive when mixed with said base metal in the dry state, an acid-forming electrolyte of the class which is stable when mixed with the base metal in the dry state, and a second electrolyte of the class which contains a metallic ion non-replaceable by the base metal and which is stable when mixed with the base metal in the dry state but which will react in a water solution of said first mentioned electrolyte to increase the hydrogen ion concentration sufficiently to effect solution of said replaceable substance, whereby to render the metallic ions of the latter available for the replacement reaction.

11. A chemical heating composition for a heat pad adapted to produce heat by chemical action with water, comprising a mixture of iron in finely divided condition, a substance selected from the group consisting of those metals and compounds of metals which are electrolytically replaceable by iron, said substance being highly insoluble in water and non-reactive when mixed with iron in the dry state, an acid-forming electrolyte of the class which is stable when mixed with iron in the dry state, and a salt of the class which contains a metallic ion non-replaceable by iron and which is stable when mixed with iron in the dry state but which will react in a water solution of said electrolyte to increase the hydrogen ion concentration sufficiently to effect solution of said replaceable substance, whereby to render the metallic ions of the latter available for the replacement reaction.

12. A chemical heating composition for a heat pad adapted to produce heat by chemical action with water, comprising a mixture of iron in finely divided condition, a substance selected from the group consisting of those metals and compounds of metals which are electrolytically replaceable by iron, said substance being highly insoluble in water and non-reactive when mixed with iron in the dry state, an electrolyte comprising a water-soluble acid of the class which remain in the solid state under normal conditions of temperature and pressure, and a second electrolyte of the class which contains a metallic ion non-replaceable by iron and which is stable when mixed with iron in the dry state but which will react in a water solution of said acid to increase the hydrogen ion concentration sufficiently to effect solution of said replaceable substance, whereby to render the metallic ions of the latter available for the replacement reaction.

13. A chemical heating composition for a heat pad adapted to produce heat by chemical action with water comprising a finely divided mixture of a base metal having the properties of iron, a substance selected from the group consisting of copper and those compounds of copper which are highly insoluble in water and non-reactive when mixed with said base metal in the dry state, an acid-forming electrolyte of the class which is stable when mixed with said base metal in the dry state, and salt of the class which contains a metallic ion non-replaceable by the base metal and which is stable when mixed with the base metal in the dry state, but which will react in a water solution of said electrolyte to increase the hydrogen ion concentration sufficiently to effect solution of said substance, whereby to render the metallic ions of the latter available for electrolytic replacement by iron.

14. A combination for producing heat by chemical action upon addition of water, comprising a base metal having the properties of iron, a substance selected from the group consisting of those metals and compounds of metals which are electrolytically replaceable by said base metal, said substance being highly insoluble in water and non-reactive when mixed with said base metal in the dry state, an acid-forming electrolyte of the class which is stable when mixed with the base metal in the dry state, and a second electrolyte of the class which contains a metallic ion non-replaceable by the base metal and which is stable when mixed with the base metal in the dry state but which will react in a water solution of said first mentioned electrolyte to promote solution of said replaceable substance, whereby to render the metallic ions of the latter available for the replacement reaction.

15. A combination for producing heat by chemical action upon addition of water, comprising iron, a substance selected from the group consisting of those metals and compounds of metals which are electrolytically replaceable by iron, said substance being highly insoluble in water and non-reactive when mixed with iron in the dry state, an acid-forming electrolyte of the class which is stable when mixed with iron in the dry state, and a salt of the class which contains a metallic ion non-replaceable by iron and which is stable when mixed with iron in the dry state but which will react in a water solution of said electrolyte to promote solution of said replaceable substance, whereby to render the metallic ions of the latter available for the replacement reaction.

RAYMOND E. REED.